(12) United States Patent
Rocchi

(10) Patent No.: US 8,789,416 B2
(45) Date of Patent: Jul. 29, 2014

(54) MEMS GYROSCOPE FOR DETECTING ROTATIONAL MOTIONS ABOUT AN X-, Y-, AND/OR Z-AXIS

(75) Inventor: Alessandro Rocchi, Rosignano Solvay (IT)

(73) Assignee: Maxim Integrated Products, Inc., San Jose, CA (US)

( * ) Notice: Subject to any disclaimer, the term of this patent is extended or adjusted under 35 U.S.C. 154(b) by 158 days.

(21) Appl. No.: 13/203,545

(22) PCT Filed: Feb. 11, 2010

(86) PCT No.: PCT/EP2010/051714
§ 371 (c)(1),
(2), (4) Date: Aug. 26, 2011

(87) PCT Pub. No.: WO2010/097297
PCT Pub. Date: Sep. 2, 2010

(65) Prior Publication Data
US 2011/0303007 A1 Dec. 15, 2011

(30) Foreign Application Priority Data
Feb. 27, 2009 (DE) .......................... 10 2009 001 248

(51) Int. Cl.
*G01C 19/56* (2012.01)
(52) U.S. Cl.
USPC ..................................... 73/504.12; 73/504.04
(58) Field of Classification Search
USPC ............ 73/504.02, 504.04, 504.12, 511, 510, 73/504.14, 504.15, 504.16
See application file for complete search history.

(56) References Cited

U.S. PATENT DOCUMENTS 5,490,420 A * 2/1996 Burdess ..................... 73/504.02
6,134,961 A 10/2000 Touge
(Continued)

FOREIGN PATENT DOCUMENTS

CN 1813192 A 8/2006
CN 101027536 A 8/2007
(Continued)

OTHER PUBLICATIONS

International Search Report mailed Mar. 5, 2010, in corresponding International Application No. PCT/EP2010/051714, filed Feb. 11, 2010.
(Continued)

*Primary Examiner* — Helen Kwok
(74) *Attorney, Agent, or Firm* — North Weber & Baugh LLP

(57) ABSTRACT

The invention relates to a MEMS gyroscope for detecting rotational motions about an x-, y-, and/or Z-axis, in particular a 3-D sensor, containing a substrate, several, at least two, preferably four, drive masses (2) that are movable radially With respect to a center and drive elements (7) for the oscillating vibration of the drive masses (2) in order to generate Coriolis forces on the drive masses (2) in the event of rotation of the substrate about the x-, y-, and/or Z-axis. The oscillating drive masses (2) are connected to at least one further non oscillating sensor mass (3) that however can be rotated about the x-, y-, and/or Z-axis together With the oscillating drive masses (2) on the substrate. Sensor elements (9, 10) are used to detect detections of the sensor mass (3) and/or drive masses (2) in relation to the substrate due to the generated Coriolis forces. At least two, preferably four anchors (5) are used to rotatably fasten the sensor mass (3) to the substrate by means of springs (4).

17 Claims, 3 Drawing Sheets

(56) References Cited

U.S. PATENT DOCUMENTS

| | | | |
|---|---|---|---|
| 6,250,157 B1 * | 6/2001 | Touge | 73/504.12 |
| 7,100,446 B1 * | 9/2006 | Acar et al. | 73/504.13 |
| 8,429,970 B2 * | 4/2013 | Rocchi | 73/504.08 |
| 2007/0194857 A1 * | 8/2007 | Schwarzelbach | 331/23 |
| 2007/0214883 A1 * | 9/2007 | Durante et al. | 73/504.04 |
| 2008/0276706 A1 * | 11/2008 | Hartmann et al. | 73/504.04 |
| 2010/0263446 A1 * | 10/2010 | Tamura et al. | 73/504.12 |
| 2011/0061460 A1 * | 3/2011 | Seeger et al. | 73/504.12 |
| 2011/0094301 A1 * | 4/2011 | Rocchi | 73/504.08 |

FOREIGN PATENT DOCUMENTS

| | | |
|---|---|---|
| EP | 183284 A1 | 9/2007 |
| JP | H6-508684 | 9/1994 |
| JP | H11-64002 | 3/1999 |
| JP | 2000-009472 | 1/2000 |
| JP | 2011-525976 | 9/2011 |
| TW | I286201 B | 9/2007 |
| WO | 9221000 A1 | 11/1992 |
| WO | WO 92/21000 A1 | 11/1992 |
| WO | 2006126253 A1 | 11/2006 |
| WO | WO 2009/156485 A1 | 12/2009 |

OTHER PUBLICATIONS

Translation of Written Opinion mailed Mar. 5, 2010, in corresponding International Application No. PCT/EP2010/051714, filed Feb. 11, 2010.
Translation of International Preliminary Report on Patentability issued Aug. 30, 2011, in corresponding International Application No. PCT/EP2010/051714, filed Feb. 11, 2010.
Office Action dated Jul. 23, 2013, in corresponding Chinese Patent Application No. 2010800092075.
Office Action dated Nov. 8, 2013, in corresponding Japanese Patent Application No. 2011551455.

* cited by examiner

MEMS GYROSCOPE FOR DETECTING ROTATIONAL MOTIONS ABOUT AN X-, Y-, AND/OR Z-AXIS

TECHNICAL FIELD

The present invention relates to a Micro-Electro-Mechanical System or MEMS gyroscope for detecting rotational movements about an x, y and/or z axis, particularly as a three-dimensional sensor, with a substrate and with several actuator driving masses which vibrate in an oscillatory manner in order to produce Coriolis forces on the driving masses during rotation of the substrate about the x, y and/or z axis.

BACKGROUND OF THE INVENTION

A three-dimensional micro-electro-mechanical MEMS gyroscope is known from TW 286201 BB. This has masses that are arranged on a central armature and that are caused to move in an oscillating rotary motion. The masses are arranged on a substrate and are tilted about the y or x axis when a torque is applied about the x or y axis due to a resulting Coriolis force. This is made possible by suitable suspension of these driving masses on the substrate. When a torque occurs that acts about the z axis, partial masses can be deflected with a translation movement as a result of another suitable suspension of these partial masses on the rotationally mounted masses. Both the tilting movements and the translational motion can be detected by sensors and can be used as a measure of the corresponding rotation about the x, y or z axis because of their proportionality to the rotational movement of the substrate. The respective displacements, however, are very difficult to determine.

In order to create a three-dimensional gyroscope as a three-dimensional sensor with which rotations can be detected in all three axes, D. Wood et al have proposed in 1996 in the article "A monocyclic silicon gyroscope capital of sensing about three axes simultaneously" a gyroscope which has oscillating masses arranged annularly around a central anchoring point These masses are capable of carrying out both tilting and rotational movements as a result of Coriolis forces that occur. The disadvantage is that the manufacture of such a sensor, as well as the drive for the moving masses, is difficult. The movements of the individual components of the sensor mutually influence each other, so that measurements of the movement in the x, y or z direction of the gyroscope do not provide sufficient accuracy.

SUMMARY OF THE INVENTION

The object of the present invention is to create a MEMS gyroscope for detecting rotational movements about an x, y and/or z axis, particularly as a three-dimensional sensor, with a high degree of detection accuracy.

The object is solved with a MEMS gyroscope for detecting rotary movements about an x, y and/or z axis, particularly as a three-dimensional sensor, with a substrate, with multiple, at least two, preferably four driving masses (2) movable radially relative to a central point, with drive elements (7) for the oscillating vibration of the driving masses (2) in order to generate Coriolis forces on the driving masses (2) in the event of rotation of the substrate about the x, y and/or z axis and wherein the oscillating driving masses (2) are connected to at least one additional sensor mass (3), which is non-oscillating but which can be rotated on the substrate about the x, y and/or z axis together with the oscillating driving masses (2) and with sensor elements (9, 10), in order to detect displacements of the sensor mass (3) and/or the driving masses (2) in relation to the substrate as a result of the generated Coriolis forces, and with at least two, preferably four anchoring devices (5) for the rotary attachment of the sensor mass (3) to the substrate by means of springs (4) and the driving masses (2) are driven in as oscillatory manner in the drive direction without exerting a relevant influence on the sensor masses (3).

According to the invention, the MEMS gyroscope for detecting rotational movements about an x, y and/or z axis comprises a substrate and several, at least two or preferably four, driving masses that are movable radially relative to a central point. Drive elements set the driving masses into an oscillating vibration as the primary oscillation in order to generate Coriolis forces acting on the driving masses when a rotation of the substrate about the x, y and/or z axis occurs. The oscillating driving masses are connected to at least one other non-oscillating sensor mass, which, together with the oscillating driving masses, can rotate on the substrate about the x, y and/or z axis. Sensor elements are provided on the MEMS gyroscope in order to detect displacements of the sensor mass and/or the driving masses in relation to the substrate as a result of the generated Coriolis forces as a secondary vibration. The sensor mass is equipped with at least two, preferably four anchoring devices for rotary attachment to the substrate by means of springs.

According to the invention, the oscillating driving masses are attached to the sensor mass and can oscillate independently of the sensor mass. The sensor mass itself is finally attached to the substrate via at least two anchoring devices. The attachment to the anchoring devices is effected via springs, which allow movements of the sensor mass together with the driving masses relative to the substrate. These movements take place as a rotary motion about the z-axis emanating from the plane of projection and as a tilting movement about the x and y axis lying in the plane of projection. As a result of this, independent rotational movements of the substrate or the gyroscope about an x-axis, a y-axis and/or a z-axis are to be determined by the sensor elements, which are arranged at the appropriate place. In particular in the configuration with four anchoring devices, by means of which the sensor mass is arranged on the substrate, a balanced mounting of the masses on the substrate is effected. The displacement of the masses resulting from the Coriolis forces occurring during a rotary motion of the substrate takes place uniformly in all directions, so that the deflection movements in all directions are of a similar type. This is especially beneficial if the four anchoring points are arranged on the x axis and the y axis, whereby two of the anchoring points are arranged on each one of these axes. This causes the tilting movement about the x axis to be of a similar type to the tilting movement about the y axis.

The springs, with which the sensor masses are attached to the anchoring device, enable the described tilting movement about the x axis and y axis and a rotation about the z axis to take place. However, they are stiff in their interaction with respect to translational movements in the x or y direction. In this way, a stable system is created which is stiff in relation to translational movements but compliant in relation to the rotational movements of the sensor mass.

In a preferred embodiment of the invention, the sensor mass encloses the driving masses in the form of a framework. This allows the driving masses to be well accommodated in the mass sensor and ensures trouble-free operation of the sensor. The framework also ensures that the driving masses are smoothly operated and supported, so that the resulting Coriolis forces and hence the corresponding tilting movements can be smoothly passed from the driving masses to the sensor mass.

If the driving masses are arranged point symmetrically in pairs relative to the centre of the sensor, then drive vibrations can be easily balanced out so that the sensor has an essentially static sensor mass when in the resting position. The sensor mass is thus not adversely affected by the moving driving masses or even set into vibration unless Coriolis forces occur.

The sensor elements for detecting the displacement of the masses about the x axis or y axis are preferably arranged below the sensor mass and/or below the driving masses as horizontal plate capacitances or as vertical capacitances in the sensor mass. For each of the arrangements referred to, the displacement of the masses about the x axis or y axis in their secondary vibrations can be detected as a change in capacitance or electrical voltage. The corresponding amplitude acts as a measure of the rotation rate acting on the rotation rate sensor.

Sensor elements are preferably arranged within or outside the sensor mass as vertical capacitances or as comb electrodes in order to detect the displacement of the masses about the z axis. The rate of rotation about the z axis can be derived from a change in the electrical amplitude.

The sensor mass is preferably fixed on the substrate using flexural springs. The flexible springs ensure that the sensor mass is arranged on the substrate by means of the corresponding anchoring device in a stable manner. The individual flexural springs are intended to work together in such a way that ideally the sensor mass and the driving masses have no contact with the substrate if they are deflected owing to the vibrations caused by the Coriolis force.

The flexural springs are preferably designed to allow a rotation of the sensor mass about the x, y and z axes. This enables rotary movements of the substrate as a secondary movement resulting from the Coriolis forces occurring in an oscillating rotation of the sensor mass about the x, y and/or z axis.

The flexural springs are preferably configured to prevent displacement of the sensor mass in the x, y and/or z direction. The flexural springs are rigidly constructed in their interaction with regard to a translational displacement of the sensor mass on the substrate, in order to prevent a displacement of the sensor mass in a linear direction on the substrate.

In particular, to enable good, sensitive displacement of the sensor mass, provision is made for the anchoring devices to be arranged in the region of the centre of the sensor. This allows the flexural springs to be configured with a suitable length, to have a low spring constant in the desired direction and therefore to be relatively soft. Bending is thus easily possible in the event of a suitable force acting on them. The sensor mass suspended from the springs can therefore be easily and repeatably tilted, even by small Coriolis forces.

The anchoring devices are preferably arranged between the driving masses. This yields a uniform distribution of anchorage points and moving masses. The displacement of the sensor mass can thus take place uniformly and systematically in all directions.

In a particularly preferred embodiment of the invention, the driving masses are attached to the sensor mass by flexural springs that exhibit elasticity in the drive direction. The driving masses can thus be driven in an oscillatory manner in the drive direction, without exerting a relevant influence on the sensor mass. The drive movement of the driving masses thus causes no direct movement of the sensor mass, although the masses are connected to each other by the flexural springs. The flexural springs are, however, relatively rigidly connected to the sensor mass in directions that deviate from the drive direction, so that the Coriolis forces acting on the driving masses can contribute to a tilting or rotary motion of the sensor mass together with the driving masses.

In a most particularly preferred embodiment of the invention the driving masses are linked to each other by synchronising springs. This advantageously enables the movements of the driving masses to occur in synchrony with each other, so that no reaction forces resulting from unequal movements of the driving masses act on the sensor mass. This would lead to displacements of the sensor mass that are not caused by the Coriolis forces. Undesirable measurement errors would result from this. However, the synchronising springs connect the individual driving masses together, so that the drive movements of the individual driving masses are equal and balance each other with respect to the forces occurring.

It is particularly advantageous if the synchronising springs are arranged very close to the centre. In particular, if they are closer to the centre than the anchoring device of the sensor mass, this will ensure that the synchronising springs and the flexural springs of the sensor mass do not obstruct each other. Moreover, the flexural springs, in the same way as the synchronising springs, are long enough that they are sufficiently elastic in the relevant direction and both the mobility of the sensor mass as well as the synchronization and mobility of the driving masses are guaranteed.

If the driving directions of the driving masses are inclined relative to each other, with four driving masses preferably at a 90° angle or with three driving masses preferably at a 120° angle, this ensures that the driving masses can be operated uniformly without any forces acting on the sensor mass that are not caused by Coriolis forces.

A particularly stable system results from the fact that, in a preferential embodiment of the invention, the driving directions of the drive elements are arranged at a 45° angle to the x/y axes. This system reacts very sensitively to Coriolis forces and is capable of indicating Coriolis forces even at low rotation rates about the appropriate axis.

The drive elements of the driving masses are preferably electrodes, in particular fork or comb electrodes. Some of the electrodes are attached to the substrate and other electrodes are arranged on the drive elements. By the application of an alternating voltage, the electrodes are attracted and repelled, producing an oscillating movement of the driving masses.

BRIEF DESCRIPTION OF THE DRAWINGS

Other advantages of the invention are described in subsequent embodiment examples. These show.

DETAILED DESCRIPTION OF THE PREFERRED EMBODIMENT

Figure 1:
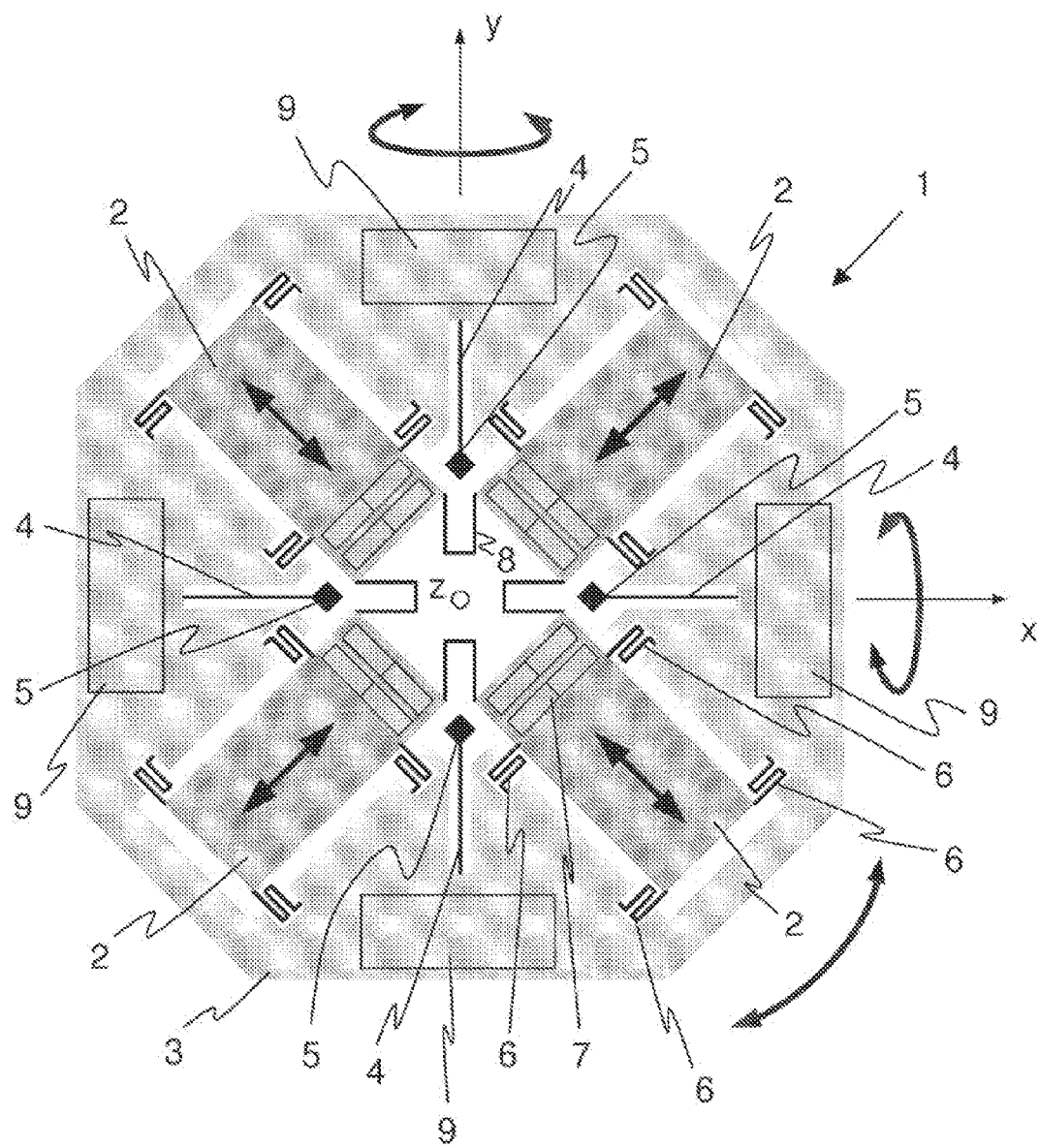
FIG. 1 a MEMS gyroscope according to the invention in plan view,
FIG. 2 another MEMS gyroscope in plan view and
FIG. 3 another MEMS gyroscope in plan view.

FIG. 1 shows the plan view of a three-dimensional MEMS gyroscope 1. In particular, it shows the moving parts of the gyroscope 1, namely four driving masses 2 and a sensor mass 3. The sensor mass 3 encloses the four driving masses 2 in the manner of a frame work. The driving masses 2 are located within the sensor mass 3.

The sensor mass 3 is arranged on a substrate (not shown) via flexural springs 4 and anchoring devices 5. The flexural springs 4 are flexurally compliant in a direction transverse to their longitudinal extension. In their longitudinal extension, however, they are stiff. This causes the sensor mass 3 to be rotatable about an x axis and a y axis lying within the plane of projection, as well as about a z axis emanating from the plane of projection. The oscillating rotary movements are represented by corresponding arrows.

The driving masses 2 are arranged so as to be framed by the sensor mass 3. The driving masses 2 are attached to the sensor mass 3 by flexural springs 6. Each of the driving masses 2 has four of these flexural springs 6. The driving masses 2 are driven in an oscillating motion in the direction of the double arrow by drive elements 7. The drive elements 7 consist, for example, of comb electrodes, some of which are attached to the substrate and others to the driving mass 2, and they therefore set the driving mass 2 into an oscillating vibration by means of an applied alternating voltage.

The flexural springs 6 are designed to be flexurally elastic in the driving direction of the driving masses 2, but to be stiff in all other directions. This causes the driving mass 2 to be largely free to oscillate in the drive direction, while in the other directions the driving mass 2 is coupled to the movements of the sensor mass 3. The sensor mass 3 together with the driving masses 2 is thus rotated as a secondary movement in a corresponding direction by a Coriolis force which arises during a rotational movement of the substrate about one or several of the x, y and/or z axes.

The four driving masses 2 are arranged in the sensor mass 3 such that they vibrate in opposition to each other in pairs and are arranged point symmetrically relative to the z-axis. In this way, forces and torques that could result from the movement of the driving masses 2 cancel each other out, and the sensor mass 3 is not set in motion owing to the drive motion of the driving masses 2 alone.

In order to achieve this balance and thus to ensure that the sensor mass 3 is stationary, the driving masses 2 are joined together by synchronising springs 8. The synchronising springs 8 are arranged on the z-axis between the anchoring device 5 and the centre of the gyroscope 1. This ensures that they do not interfere with the movement of the flexural springs 4 and the anchoring device 5. The synchronising springs 8 are formed in a U-shape. A periodic movement of the two driving masses 2, which are linked together by the synchronising springs 8, towards and away from each other produces a varying distance between the two driving masses 2. The synchronising springs 8 can be spread accordingly during this process, due to their shaping. The synchronising springs 8 exert forces on the driving masses 2 with the result that differences in speed are compensated and hence the drive movements of the four driving masses 2 take place synchronously.

Plate capacitances 9 are arranged in the region of the x and y axes below the sensor mass 3. An electrical signal is generated by these plate capacitances 9 as soon as the sensor mass 3 rotates about the x or y axis. This signal is proportional to the Coriolis force that arises as a result of a rotation of the substrate about the x or y axis. In order to detect the rotational movement of the sensor mass 3 about the z axis, comb electrodes, for example, are provided, especially at the periphery or outer area of the sensor mass 3, which detect a rotary movement of the sensor mass 3 about the z axis in the form of an electrical signal and allow conclusions to be drawn regarding a corresponding rotation of the substrate.

By attachment of the sensor mass 3 on the anchoring device 5 of the substrate by means of the flexural springs 4, and by attachment of the driving masses 2 by means of the flexural springs 6 to the sensor mass 3, a system is produced in which the primary movement of the driving mass 2 is maximally decoupled from the secondary movement, which arises as a result of the driving masses 2 and the coupling to the sensor mass 3. The rotational movement of the driving masses 2 and sensor mass 3 as a response to a rotation of the gyroscope 1 or of the substrate, to which the sensor mass 3 and the driving mass 2 are attached, can be detected without its being disturbed by the drive movement of the driving masses 2.

After the secondary movement has taken place, coupled via the driving mass 2 and the sensor mass 3, there is also a possible alternative to this example, whereby the sensor elements, in this case the plate capacitances 9, are arranged not only below the sensor mass 3, but also below the driving mass 2. This also clearly applies to the sensor elements that detect the rotation around the z-axis. Again, the motion is jointly carried out by the driving masses 2 and the sensor mass 3, so that this movement can also occur in the region of the driving masses and/or the sensor mass 3.

Figure 2:
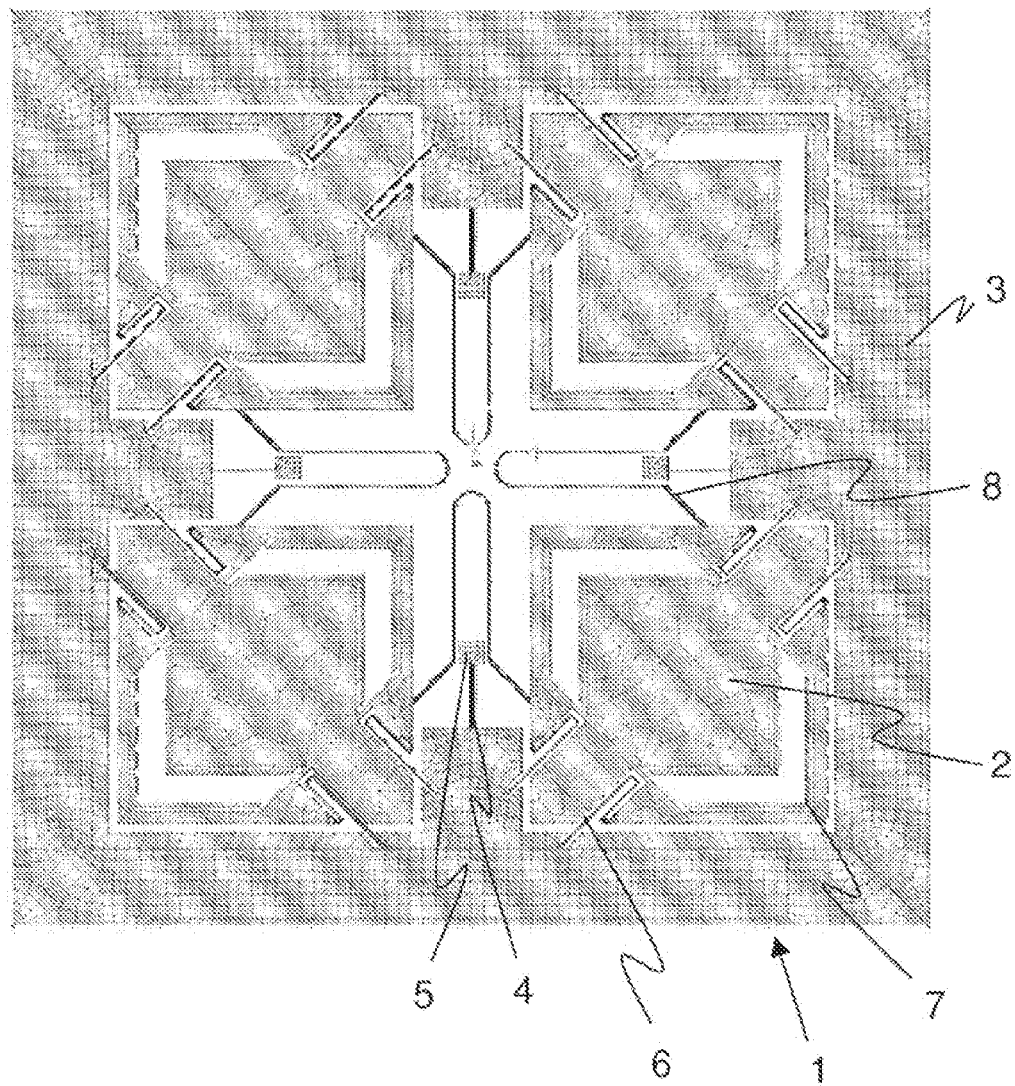

FIG. 2 illustrates an alternative example to the MEMS gyroscope shown in FIG. 1. Similar components are denoted using the same reference labels as are used in FIG. 1. Just as in FIG. 1, the MEMS gyroscope 1 has four driving masses 2, which are each connected to the sensor mass 3 by means of four flexural springs 6. The sensor mass 3 encloses the four driving masses 2 in the manner of a frame. The driving masses 2 move at an angle of 45° to the x and y axes in a direction that extends through the centre of the gyroscope 1 in the region of the z axis, and towards and away from the centre. Opposite driving masses 2 move in an oscillating motion in opposite directions so as to prevent vibrations from occurring on the sensor mass 3.

The sensor mass 3 is anchored using one flexural spring 4 each to a total of four anchoring devices 5 such as to be able to rotate and tilt about the x, y and z axes. The synchronising springs 8, which extend between the anchoring devices 5 and the centre of the gyroscope 1, ensure that the driving masses 2 oscillate synchronously with respect to each other. The flexural springs 6, with which the driving masses 2 are connected to the sensor mass 3, allow oscillating movements of the driving masses 2 in the drive direction, but are rigid in all other directions, such that Coriolis forces that occur can be transmitted from the driving masses 2 to the sensor mass 3.

Figure 3:
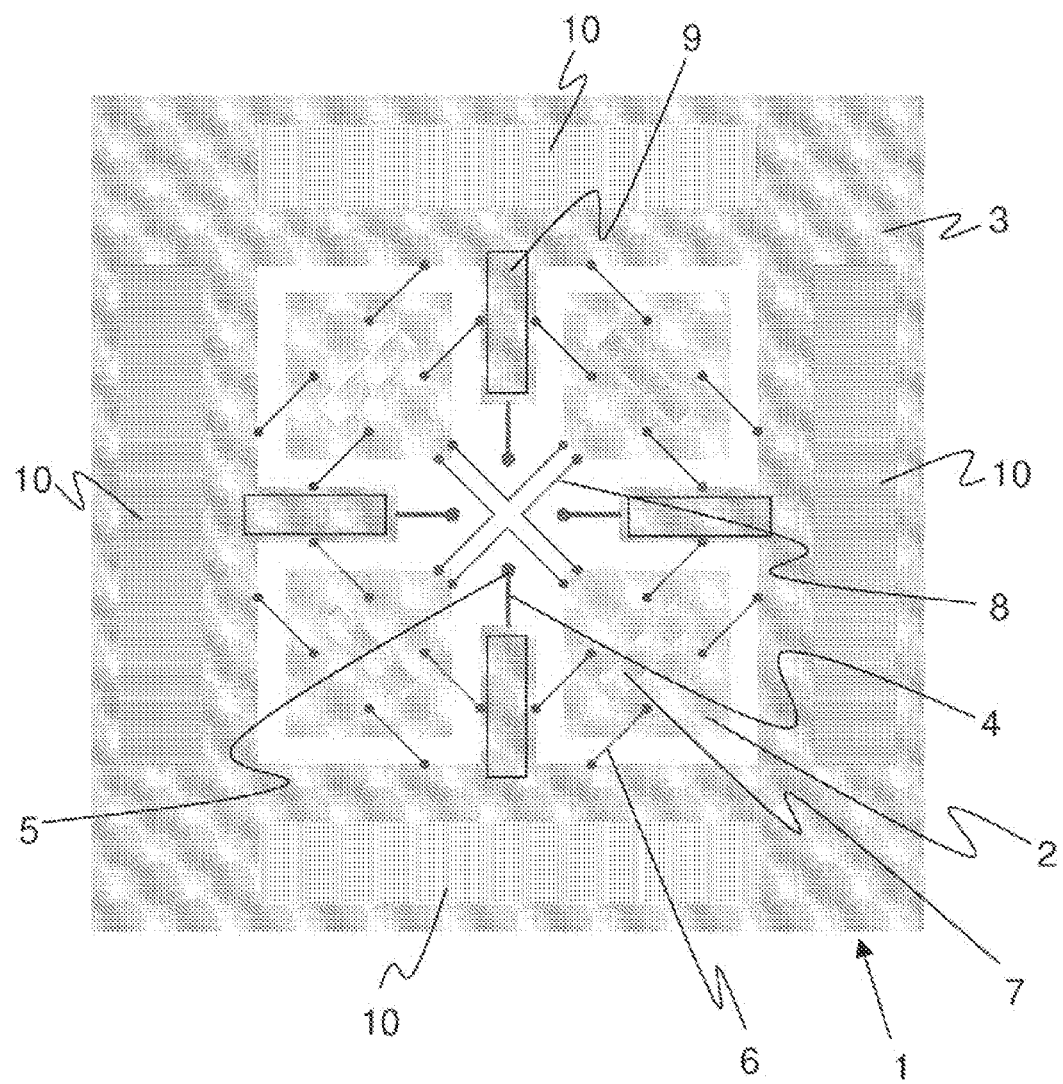

A further embodiment of a three-dimensional MEMS gyroscope 1 according to the invention is illustrated In FIG. 3. The connection of the driving masses 2 to the sensor mass 3 and the connection of the sensor mass 3 via the flexural springs 4 and the anchoring devices 5 on the substrate are made in a similar way as in the exemplary embodiments in FIGS. 1 and 2. The synchronising springs 8 are formed in the shape of an arrow in this embodiment, but are also oriented towards the centre of the gyroscope 1. The detection of the rotary motion of the sensor mass 3 and driving masses 2 about the x, y or z axis is carried out in this embodiment of the invention by means of sensor elements 10, which are arranged within the sensor mass 3. These sensor elements 10 are, for example, vertical capacitances, which produce variable electrical signals in the event of a rotary movement of the sensor mass 3 about the z axis. With a suitable configuration, a rotation about the x or y axis of the sensor mass 3 can be detected with these sensor elements 10 or with similar sensor elements, or even with plate capacitances, as illustrated in the version in FIG. 1.

The invention is not limited to the illustrated examples. In particular, the number of driving masses can thus be different from the number shown here. In addition, the manner of detecting the rotational movement of the sensor mass 3 may be different than that illustrated here. The design of the driving masses 2 and the sensor mass 3 is furthermore not necessarily angular, but can be rounded or circular in another embodiment of the invention. In addition to the foregoing, the invention relates to all embodiments that are formed according to the current claims.

The invention claimed is:

1. MEMS gyroscope for detecting rotary movements about an x, y and/or z axis comprising,
   a substrate;
   at least two driving masses, wherein the driving masses are movable radially relative to a central point; and
   drive elements for oscillating vibration of the driving masses in order to generate Coriolis forces on the driving masses in event of rotation of the substrate about the x, y and/or z axis,
   wherein the oscillating driving masses are connected to at least one additional sensor mass, which is non-oscillating but which can be rotated on the substrate about the x, y and/or z axis together with the oscillating driving masses and with sensor elements, in order to detect displacements of sensor mass and/or the driving masses in relation to the substrate as a result of generated Coriolis forces, and with at least two anchoring devices for rotary attachment of the sensor mass to the substrate by means of springs and
   the driving masses are driven in as oscillatory manner in drive direction without exerting a relevant influence on the sensor mass.

2. MEMS gyroscope according to claim 1 wherein the sensor mass encloses the driving masses as a frame.

3. MEMS gyroscope according to according to claim 1 wherein the driving masses are arranged in pairs and point-symmetrically relative to central point of sensor in order to balance out drive vibrations.

4. MEMS gyroscope according to claim 1 wherein the sensor elements for detecting the displacement of the driving masses and the sensor mass about x and/or y axis are arranged below sensor mass and/or the driving masses as horizontal plate capacitances or are arranged within the sensor mass as vertical capacitances.

5. MEMS gyroscope according to claim 1 wherein the sensor elements to detect displacement of driving masses and the sensor mass about the z axis are arranged within and/or outside the sensor mass as vertical capacitances or as comb electrodes.

6. MEMS gyroscope according to claim 1 wherein the sensor mass is attached to the substrate by flexural springs.

7. MEMS gyroscope according to claim 1 wherein flexural springs enable rotation of the sensor mass about the x, y and z axes.

8. MEMS gyroscope according to claim 1 wherein flexural springs are designed in such a way that the flexural springs prevent the displacement of the sensor mass in the x, y or z direction.

9. MEMS gyroscope according to claim 1 wherein the anchoring devices are arranged in a region of the central point.

10. MEMS gyroscope according to claim 1 wherein the anchoring devices are arranged between the driving masses.

11. MEMS gyroscope according to claim 1 wherein the driving masses are attached to the sensor mass by means of flexural springs that are elastic in the drive direction.

12. MEMS gyroscope according to claim 1 wherein the driving masses are connected together by synchronising springs.

13. MEMS gyroscope according to claim 1 wherein if the driving directions of the driving masses are inclined relative to each other, with four driving masses inclination is a 90° angle or with three driving masses the inclination is a 120° angle.

14. MEMS gyroscope according to claim 1 wherein drive directions are provided at an angle of 45° to x/y axes.

15. MEMS gyroscope according to claim 1 wherein the drive elements of the drive masses are electrodes or fork electrodes.

16. MEMS gyroscope according to claim 1 wherein number of driving masses is four.

17. MEMS gyroscope according to claim 1 wherein number of anchoring devices is four.

* * * * *